United States Patent
Schreiber et al.

(10) Patent No.: US 9,696,467 B2
(45) Date of Patent: Jul. 4, 2017

(54) UV AND DUV EXPANDED COLD MIRRORS

(71) Applicant: Corning Incorporated, Corning, NY (US)

(72) Inventors: Horst Schreiber, Corning, NY (US); Jue Wang, Fairport, NY (US)

(73) Assignee: Corning Incorporated, Corning, NY (US)

( * ) Notice: Subject to any disclaimer, the term of this patent is extended or adjusted under 35 U.S.C. 154(b) by 171 days.

(21) Appl. No.: 14/602,550

(22) Filed: Jan. 22, 2015

(65) Prior Publication Data

US 2015/0219805 A1 Aug. 6, 2015

Related U.S. Application Data

(60) Provisional application No. 61/934,351, filed on Jan. 31, 2014.

(51) Int. Cl.
*G02B 5/08* (2006.01)
*G02B 5/20* (2006.01)
(Continued)

(52) U.S. Cl.
CPC .............. *G02B 5/0891* (2013.01); *G02B 1/10* (2013.01); *G02B 1/12* (2013.01); *G02B 5/0833* (2013.01); *G02B 5/283* (2013.01)

(58) Field of Classification Search
CPC .............. G03F 7/70033; G03F 7/70958; G02B 5/0833; G02B 5/0891; G02B 5/208;
(Continued)

(56) References Cited

U.S. PATENT DOCUMENTS 4,101,707 A * 7/1978 Henry .................. G02B 1/02
117/904
5,850,309 A * 12/1998 Shirai .................. G02B 5/0891
359/360

(Continued)

FOREIGN PATENT DOCUMENTS

DE WO 2010034367 A1 * 4/2010 ........... G02B 5/0833
DE 102010017106 12/2011
WO 2010034367 4/2010

OTHER PUBLICATIONS

Marco Perske et al, "New high reflective multilayer designs for the EUV and soft X-ray range", presented at 2012 International Workshop on EUV and Soft X-Ray Sources, Dublin, Oct. 10, 2012, IOF.

(Continued)

*Primary Examiner* — Bumsuk Won
*Assistant Examiner* — Collin X Beatty
(74) *Attorney, Agent, or Firm* — Kevin L. Bray

(57) ABSTRACT

An expanded cold mirror is provided. The mirror includes a substrate and a coating deposited on the substrate. The coating includes a first coating stack comprising at least one period of a low refractive index metal oxide coating layer and a high refractive index metal oxide coating layer, a second coating stack comprising at least one period of a low refractive index metal fluoride coating layer and a high refractive index metal oxide layer, and a third coating stack comprising at least one period of a low refractive index metal fluoride coating layer and a high refractive index metal fluoride coating layer.

20 Claims, 8 Drawing Sheets

(51) Int. Cl.
*G02B 1/10* (2015.01)
*G02B 1/12* (2006.01)
*G02B 5/28* (2006.01)

(58) Field of Classification Search
CPC .. G02B 5/283; G02B 1/10; G02B 1/12; H01S 3/08059
USPC .......... 359/351, 359, 485.07, 582, 586, 587; 250/461.1
See application file for complete search history.

(56) References Cited

U.S. PATENT DOCUMENTS

| | | | | |
|---|---|---|---|---|
| 6,310,905 | B1* | 10/2001 | Shirai | G02B 5/0891 359/360 |
| 6,574,039 | B1* | 6/2003 | Murata | B82Y 10/00 355/67 |
| 6,809,876 | B2* | 10/2004 | Taki | C04B 35/553 359/649 |
| 7,172,788 | B2* | 2/2007 | Yakshin | B82Y 10/00 356/445 |
| 7,193,228 | B2* | 3/2007 | Bowering | B82Y 10/00 250/493.1 |
| 7,435,982 | B2 | 10/2008 | Smith | |
| 7,683,650 | B1 | 3/2010 | Baker et al. | |
| 7,705,331 | B1 | 4/2010 | Kirk et al. | |
| 7,786,455 | B2 | 8/2010 | Smith | |
| 7,843,632 | B2* | 11/2010 | Bowering | G02B 5/0891 250/504 R |
| 7,961,383 | B2 | 6/2011 | Wang et al. | |
| 8,153,241 | B2* | 4/2012 | Schreiber | G02B 5/0833 359/485.07 |
| 8,169,705 | B2* | 5/2012 | Cangemi | C23C 14/06 359/586 |
| 8,411,355 | B2* | 4/2013 | Tsarfati | B82Y 10/00 359/359 |
| 8,526,104 | B2* | 9/2013 | Schreiber | B82Y 10/00 359/360 |
| 8,693,090 | B2* | 4/2014 | Metzmacher | B82Y 10/00 359/360 |
| 9,297,936 | B2* | 3/2016 | Erxmeyer | G02B 5/0833 |
| 9,417,515 | B2* | 8/2016 | Barman | G03F 1/24 |
| 2002/0034594 | A1 | 3/2002 | Shiveley | |
| 2003/0142296 | A1 | 7/2003 | Schmidt et al. | |
| 2004/0070977 | A1 | 4/2004 | Tausch et al. | |
| 2006/0028834 | A1 | 2/2006 | Miller et al. | |
| 2006/0292311 | A1 | 12/2006 | Kilburn et al. | |
| 2008/0175002 | A1 | 7/2008 | Papac et al. | |
| 2008/0204862 | A1 | 8/2008 | Wang et al. | |
| 2008/0213904 | A1 | 9/2008 | Sliwa et al. | |
| 2009/0091821 | A1 | 4/2009 | Regan | |
| 2010/0181706 | A1 | 7/2010 | Ruuttu et al. | |
| 2010/0214660 | A1 | 8/2010 | Miao | |
| 2010/0215932 | A1 | 8/2010 | Schreiber et al. | |
| 2011/0292198 | A1 | 12/2011 | Lapstun et al. | |
| 2011/0292199 | A1 | 12/2011 | Lapstun et al. | |
| 2011/0294543 | A1 | 12/2011 | Lapstun et al. | |
| 2012/0229617 | A1 | 9/2012 | Yates et al. | |
| 2012/0331592 | A1 | 12/2012 | Ohnesorge | |

OTHER PUBLICATIONS

LDLS™ Laser-Driven Light Sources, EQ-99 Compact, High Brightness, Long-Life, Broadband Light Source, LDLS Data Sheet Energetiq Technology, 2011.
Gary A. Shaw et al., Deep UV Photon-Counting Detectors and Applications, Advanced Photon Counting Techniques III, Proc. of SPIE vol. 7320 73200J, 1-15, 2009.
Zhipei Sun et al., Fibre sources in the deep ultraviolet, Nature Photonics, vol. 5, 446-447, Aug. 2011.
Wen-Di Li et al., Solar-blind deep-UV band-pass filter (250-350 nm) consisting of a metal nano-grid fabricated by nanoimprint lithography, Optics Express, vol. 18, No. 2, 932-937, OSA, 2010.
Jun Feng et al., "A Stigmatic Ultraviolet-visible Monochromator for Use With a High Brightness Laser Driven Plasma Light Source", Rev. Sci. Instrum. 84, 085114, 2013.
DE102010017106—machine translation.
International Search Report, issued in connection with corresponding PCT application No. PCT/US2015/013421, Apr. 24, 2015.

* cited by examiner

UV AND DUV EXPANDED COLD MIRRORS

This application claims the benefit of priority under 35 U.S.C. §119 of U.S. Provisional Application Ser. No. 61/934,351 filed on Jan. 31, 2014, the content of which is relied upon and incorporated herein by reference in its entirety.

FIELD

The present disclosure is directed to coated mirrors for deep ultraviolet (DUV) lithography applications, and in particular, to infrared transparent cold mirrors having high reflectance over a broad wavelength band in the UV-DUV region.

BACKGROUND

Laser produced plasma (LPP) has been extensively investigated as a potential high power light source for the Extreme Ultraviolet (EUV) lithography industry. Generally in LLP, a high power infrared laser is used to irradiate a metal or gas target to generate plasma emitting EUV radiation, and the radiation is then collected by an EUV collector mirror. Similar concepts have been used to develop broadband UV-VIS light sources, specifically laser-driven light sources (such as LDLS™, commercially available from Energetiq Technology Inc., Woburn, Mass.).

The LDLS concept is very similar to LPP as a source for EUV radiation. A focused high power infrared (IR) laser passes through a hole at the center of a collector mirror. This configuration is due to lack of an IR transparent and DUV-VIS high reflective mirror, or a UV-DUV expanded cold mirror. As an alternative to a conventional cold mirror, aluminum-based mirror have been used. However, the aluminum-based mirror is opaque in the IR range, and thus does not transmit light from the IR laser. As a result, a center hole in the mirror is commonly necessary in order to allow passage of light from the IR laser. In addition, the aluminum-based mirror has a low damage threshold which makes the aluminum-based mirror less compatible with high power light sources.

Cold mirrors are frequently applied to reflectors that are located close to a source. FIG. 1A illustrates a cold mirror having an angle of incidence of 0 degrees. FIG. 1B, is a graph of reflectance versus wavelength for the cold mirror of FIG. 1A, shows that the cold mirror has high reflectance at wavelengths of about 400 nm to about 650 nm when operating in the VIS-IR range. Similarly, FIG. 1C illustrates a cold mirror having an angle of incidence of 45 degrees. FIG. 1D, which is a graph of reflectance versus wavelength for the cold mirror of FIG. 1C, shows that the cold mirror has high reflectance at wavelengths of about 400 nm to about 650 nm when operating in the VIS-IR range. Such cold mirrors are designed to reflect about 90% of visible light and to transmit about 80% of infrared radiation/energy (heat) and may be used to provide visible light for lighting applications, such as lighting for stadiums, projection lighting, studio settings, medical applications and others, while also reducing the amount of reflected heat.

Although a conventional cold mirror can be modified to provide high transmittance in the NIR range, the high reflective band in the DUV range of the mirror is limited. For example, as shown in FIG. 2, the high reflective band in the DUV range for a conventional cold mirror operating at an angle of incidence of 0 degrees is about 15 nm. Similarly, as shown in FIG. 3, the high reflective band in the DUV range for a conventional cold mirror operating at an angle of incidence of 45 degrees is about 10 nm.

SUMMARY

According to an embodiment of the present disclosure, an expanded cold mirror is provided. The mirror includes a substrate and a coating deposited on the substrate. The coating includes a first coating stack comprising at least one period of a low refractive index metal oxide coating layer and a high refractive index metal oxide coating layer, a second coating stack comprising at least one period of a low refractive index metal fluoride coating layer and a high refractive index metal oxide layer, and a third coating stack comprising at least one period of a low refractive index metal fluoride coating layer and a high refractive index metal fluoride coating layer.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

Figure 1A:
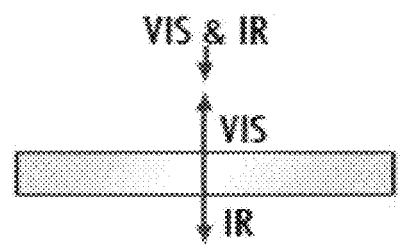
FIG. 1A is an illustration of a conventional cold mirror operating at an angle of incidence of 0 degrees.
Figure 1B:
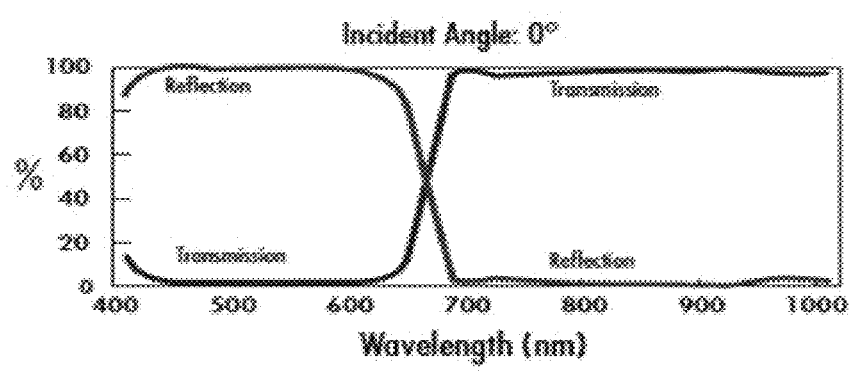
FIG. 1B is a graph of reflectance and transmittance versus wavelength for the cold mirror of FIG. 1A.
Figure 1C:
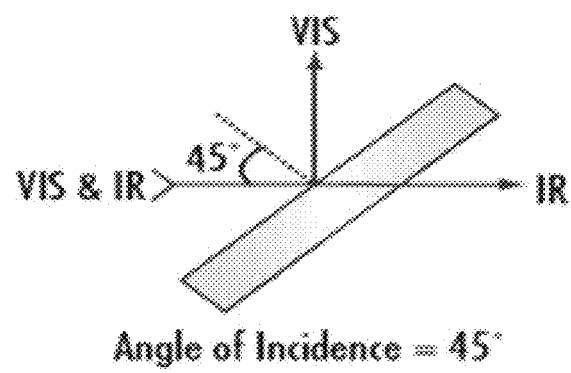
FIG. 1C is an illustration of a conventional cold mirror operating at an angle of incidence of 45 degrees.
Figure 1D:
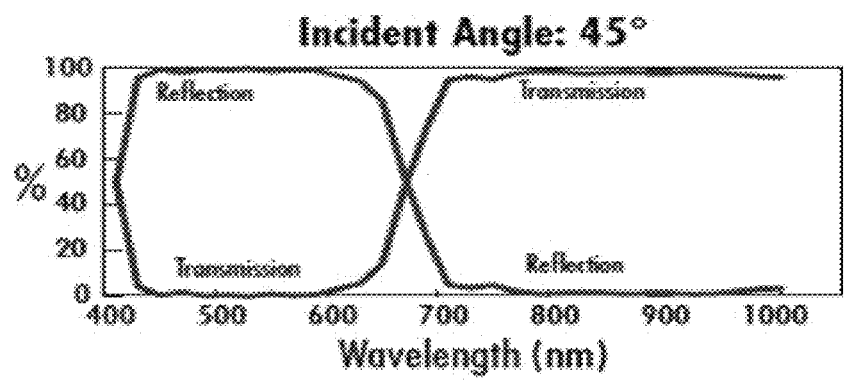
FIG. 1D is a graph of reflectance and transmittance versus wavelength for the cold mirror of FIG. 1C.
Figure 2:
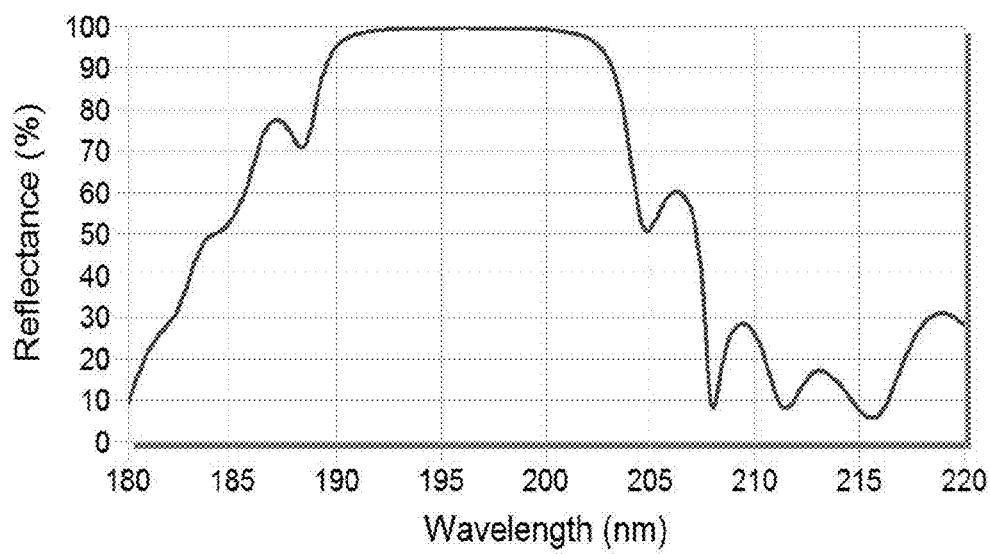
FIG. 2 is a graph of reflectance versus wavelength for a conventional DUV cold mirror operating at an angle of incidence of 0 degrees.
Figure 3:
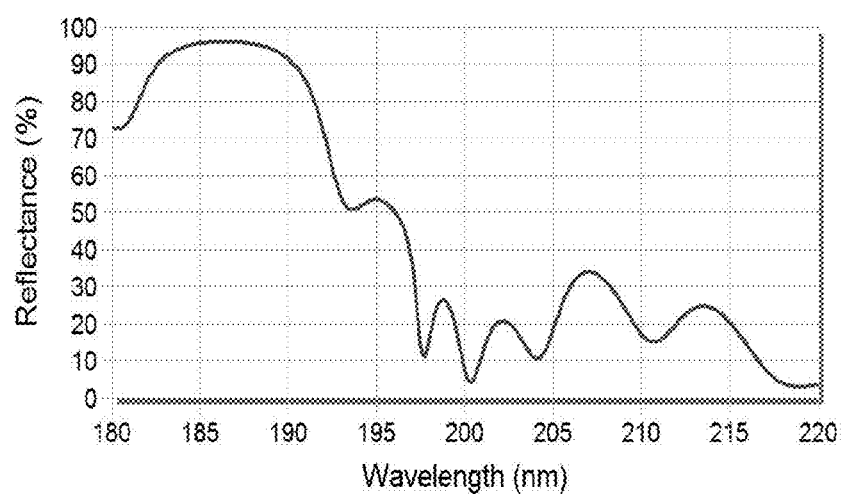
FIG. 3 is a graph of reflectance versus wavelength for a conventional DUV cold mirror operating at an angle of incidence of 45 degrees.

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

As used herein, the following terms refer to different light ranges: near infrared (NIR) light is in the range of about 750 nm to about 1400 nm; visible (VIS) light is in the range of about 400 nm to about 750 nm; ultraviolet (UV) light is in the range of about 300 nm to about 400 nm; middle ultraviolet light is in the range of about 200 nm to about 300 nm; and deep ultraviolet (DUV) light is in the range of about 122 nm to about 200 nm. As used herein, the UV-DUV range is between about 122 nm and about 400 nm. Also as used herein, the term "cold mirror" refers to a mirror that reflects visible light while transmitting infrared light.

As used herein, the term "period" refers to a coating layer pair that repeats to form a periodical multilayer structure. Also as used herein, the term "stack" refers to a plurality of such layer pairs. The periods are described throughout the disclosure using a low refractive index to high refractive index format such as "$L_o/H_o$", "$L_f/H_o$" and "$L_f/H_f$", where $L_o$ is a low refractive index metal oxide, $H_o$ is a high refractive index metal oxide, $L_f$ is a low refractive index metal fluoride, and $H_f$ is a high refractive index metal fluoride.

Embodiments of the present disclosure are directed to an IR transparent cold mirror having high reflectance over a broad wavelength band in the UV-DUV region, and to methods for forming at least one coating on the expanded cold mirror.

The expanded cold mirror disclosed herein includes a substrate. The substrate may be for example, but is not limited to, $CaF_2$, $SiO_2$, F—$SiO_2$, fused silica, for example HPFS® (commercially available from Corning Incorporated, Corning, N.Y.) and quartz. The expanded cold mirror also includes at least one coating deposited on the substrate. The at least one coating includes at least one coating material. According to an embodiment of the present disclosure, the at least one coating may include at least five coating materials, wherein the at least five coating materials are deposited in at least three coating stacks.

Figure 4:
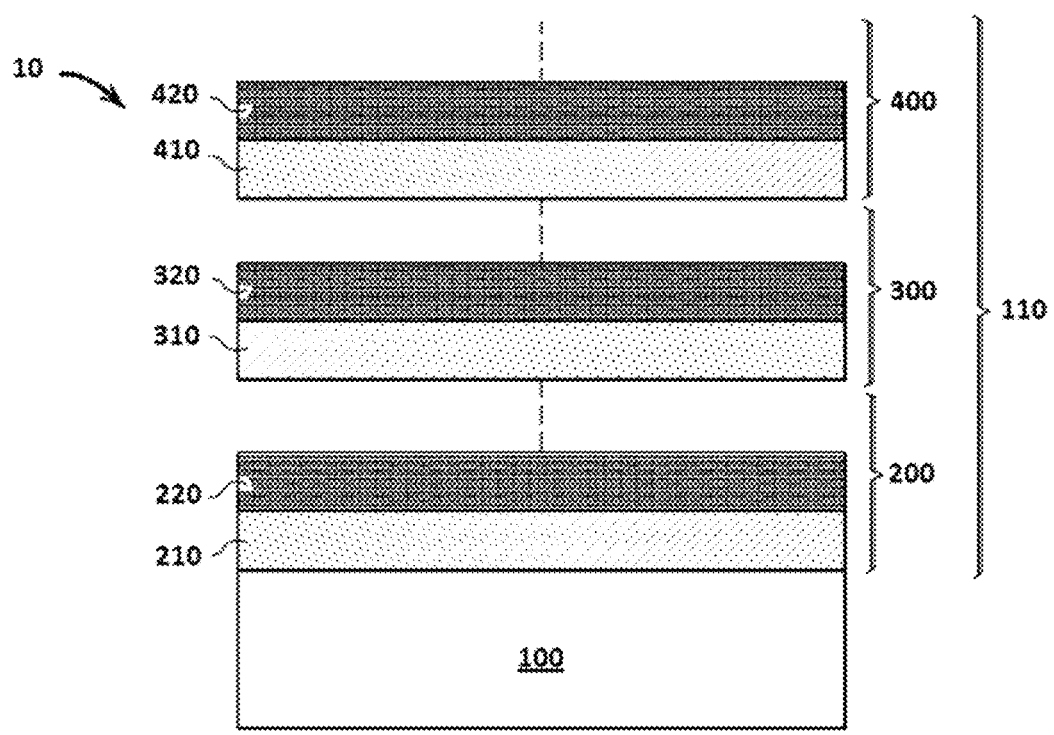
FIG. 4 is a schematic diagram of a cold mirror in accordance with embodiments of the present disclosure.

FIG. 4 is a schematic diagram of a cold mirror 10 in accordance with embodiments of the present disclosure. As shown, the cold mirror 10 includes a substrate 100 and a coating 110 deposited on the substrate 100. The coating 110 includes a first coating stack 200, a second coating stack 300 and a third coating stack 400. As shown, the first coating stack includes at least one period of a first layer 210 and a second layer 220. The second coating stack includes at least one period of a first layer 310 and a second layer 320. The third coating stack includes at least one period of a first layer 410 and a second layer 420.

The first coating stack 200 is deposited on the substrate 100. The first coating stack 200 may include at least one period of a first layer 210 and a second layer 220. The first layer 210 may be a high refractive index metal oxide and the second layer 220 may be a low refractive index metal oxide. The high refractive index metal oxide may be, but is not limited to, $Al_2O_3$, $Ta_2O_5$, $Nb_2O_5$, $TiO_2$, $HfO_2$ and $Sc_2O_3$. The low refractive index metal oxide may be, but is not limited to, $SiO_2$, F—$SiO_2$. N-doped $SiO_2$ and Al-doped $SiO_2$. For example, at least one period may include $SiO_2$/$HfO_2$, where $SiO_2$ is the low refractive index metal oxide and $HfO_2$ is the high refractive index metal oxide. The at least one period may include other high and low refractive index metal oxide pairs, such as, but not limited to, a $SiO_2$/$Sc_2O_3$. At least one period may also include $SiO_2$/$Ta_2O_5$, $SiO_2$/$Nb_2O_5$, or $SiO_2$/$TiO_2$ deposited on the substrate 100 and at least one second period of a $SiO_2$/$HfO_2$ or $SiO_2$/$Sc_2O_3$ deposited on the at least one first period. The first coating stack 200 provides to the at least one coating 110 high reflectance from the UV region to the VIS region. As used herein, the term "high reflectance" refers to a % reflectance greater than about 95%. For example, at an angle of incidence of 45 degrees, the first coating stack 200 has a high reflectance between about 250 nm and about 760 nm.

The second coating stack 300 is deposited over the first coating stack 200. The second coating stack 300 may include at least one period of a first layer 310 and a second layer 320. The first layer 310 may be a layer of a low refractive index metal fluoride and the second layer 320 may be a layer of a high refractive index metal oxide. The high refractive index metal oxide may be, but is not limited to, $Al_2O_3$, $Ta_2O_5$, $Nb_2O_5$, $TiO_2$, $HfO_2$, and $Sc_2O_3$. The low refractive index metal fluoride may be, but is not limited to, $AlF_3$, $MgF_2$, $CaF_2$, $BaF_2$, $SrF_2$ and $Na_3AlF_6$. For example, the at least one period may be $AlF_3$/$Al_2O_3$, where $AlF_3$ is the low refractive index metal fluoride and $Al_2O_3$ is the high refractive index metal oxide. The at least one period may include other low refractive index metal fluoride and high refractive index metal oxide pairs, such as, but not limited to, $MgF_2$/$Al_2O_3$ or $Na_3AlF_6$/$Al_2O_3$. The second coating stack 300 further provides to the at least one coating 110 high reflectance in the UV region. For example, at an angle of incidence of 45 degrees, the second coating stack 300 deposited over the first coating stack 200 expands the high reflectance of between about 250 nm and about 760 nm for the first coating stack 200 to between about 200 nm and about 760 nm for the combination of the first coating stack 200 and the second coating stack 300.

Figure 5:
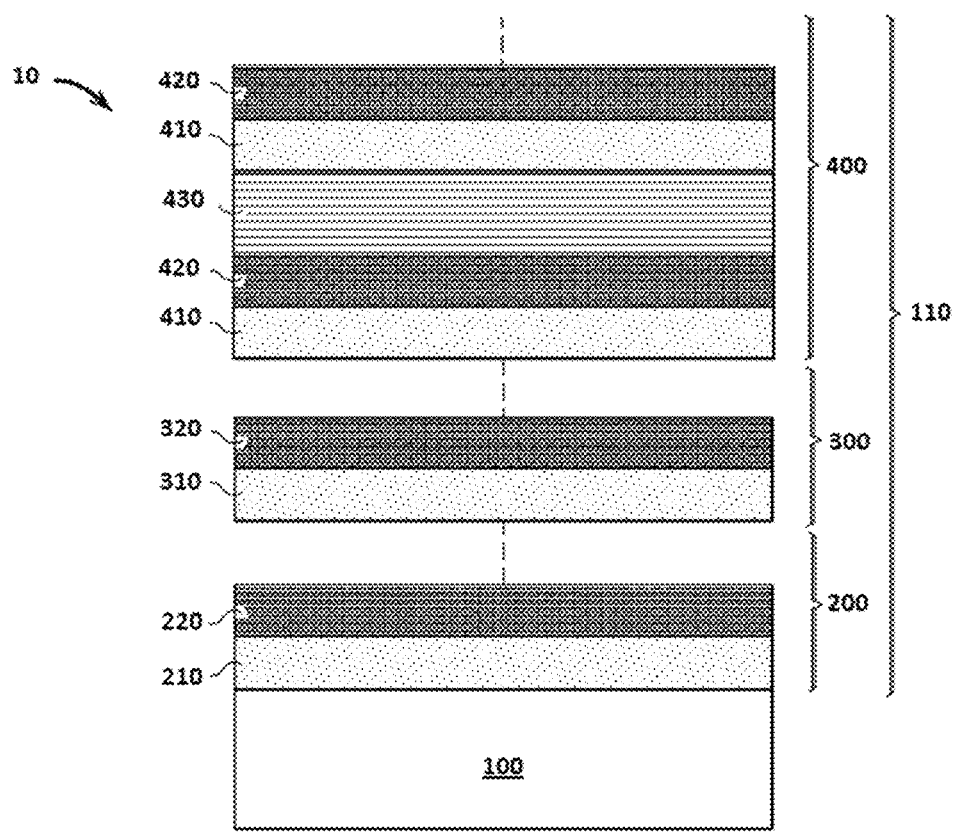
FIG. 5 is a schematic diagram of a cold mirror in accordance with embodiments of the present disclosure.
Figure 6:
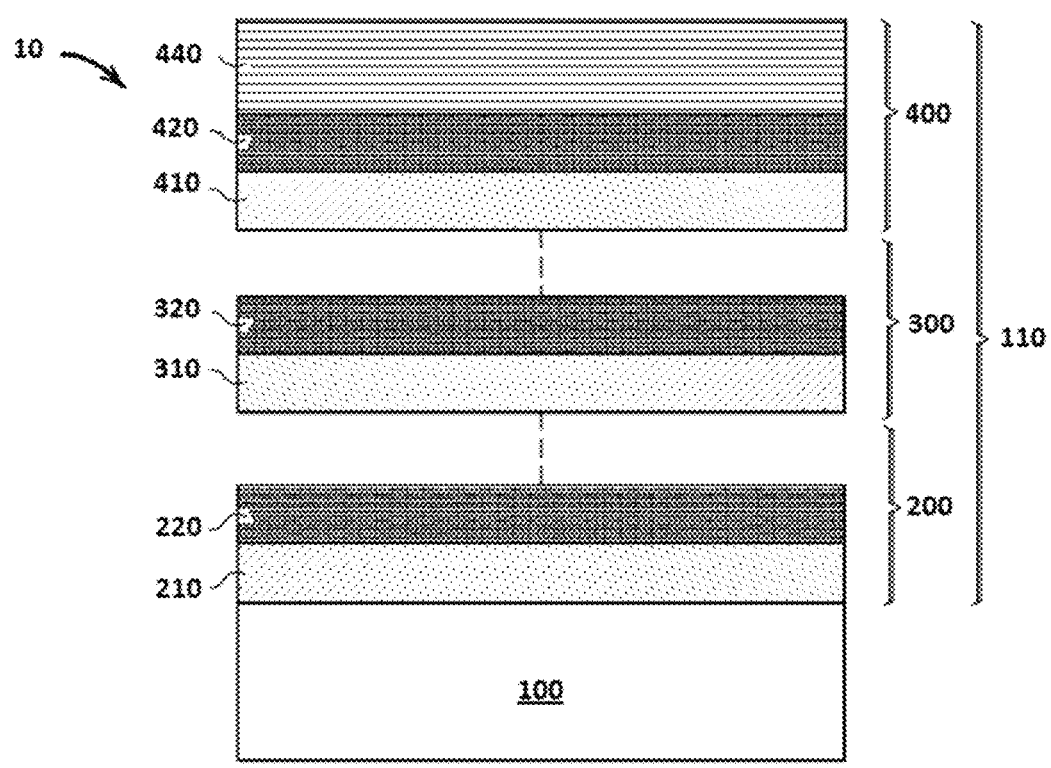
FIG. 6 is a schematic diagram of a cold mirror in accordance with embodiments of the present disclosure.

The third coating stack 400 is deposited over the second coating stack 300. The third coating stack 400 may include at least one period of a first layer 410 and a second layer 420. The first layer 410 may be a high refractive index metal fluoride and the second layer 420 may be a low refractive index metal fluoride. The low refractive index metal fluoride may be, but is not limited to, $AlF_3$, $MgF_2$, $CaF_2$, $BaF_2$, $SrF_2$ and $Na_3AlF_6$. The high refractive index metal fluoride may be, but is not limited to, a lanthanide metal fluoride such as $LaF_3$, $GdF_3$, $PrF_3$, $NdF_3$, $PmF_3$, $SmF_3$, $EuF_3$, $DyF_3$ and $HoF_3$. For example, the at least one period may be $AlF_3$/$GdF_3$, where $AlF_3$ is the low refractive index metal fluoride and $GdF_3$ is the high refractive index metal fluoride. The at least one period may include other high and low refractive index metal fluoride pairs, such as, but not limited to, $MgF_2$/$LaF_3$, $Na_3AlF_6$/$LaF_3$, $Na_3AlF_6$/$GdF_3$ or $MgF_2$/$GdF_3$. As shown in FIG. 5, the third coating stack 400 may also include at least one intermediate layer 430 between periods of the third coating stack 400. The intermediate layer 430 may be fluoride doped silica (F—$SiO_2$) layer deposited to provide interface smoothing. In addition, as shown in FIG. 6, the third coating stack 400 may also include a capping layer 440. The capping layer may be a F—SiO$_2$ layer deposited over the outermost layer of the third coating stack 400 as a top or layer to seal the at least one coating 110. The third coating stack 400 further provides to the at least one coating 110 high reflectance in the DUV region. For example, at an angle of incidence of 45 degrees, the third coating stack 400 deposited over the second coating stack 300 expands the high reflectance of between about 200 nm and about 760 nm for the first coating stack 200 and the second coating stack 300 to between about 180 nm and about 760 nm for the combination of the first coating stack 200, the second coating stack 300 and the third coating stack 400. The combination of the first coating stack 200, the second coating stack 300 and the third coating stack 400 also provides to the at least one coating 110 anti-reflective properties in the NIR region.

It should be appreciated that the different layers as illustrated in FIGS. 4-6 have described only some embodiments of the cold mirror disclosed herein for ease of understanding. It should be appreciated that the configuration of the layers in some or all of the periods of each of the coating stacks may be reversed. For example, the first layer 210 and the second layer 220 of the first coating stack 200 may be reversed such that the first layer 210 may be a low refractive index metal oxide and the second layer 220 may be a high refractive index metal oxide. Furthermore, it should be appreciated that the dashed lines of FIG. 4-6 are meant to illustrate that each of the coating stacks may include more than one period.

While the reflectance of embodiments of the present disclosure have been discussed above with regards to an angle of incidence of 45 degrees, the cold mirror discussed herein also has a high reflectance from between about 250 nm and about 760 nm when the angle of incidence is 30 degrees, 40 degrees, or even 60 degrees, and a reflectance of greater than about 90% from between about 200 nm and about 760 nm when the angle of incidence is 30 degrees, 40 degrees, or even 60 degrees.

Figure 7:
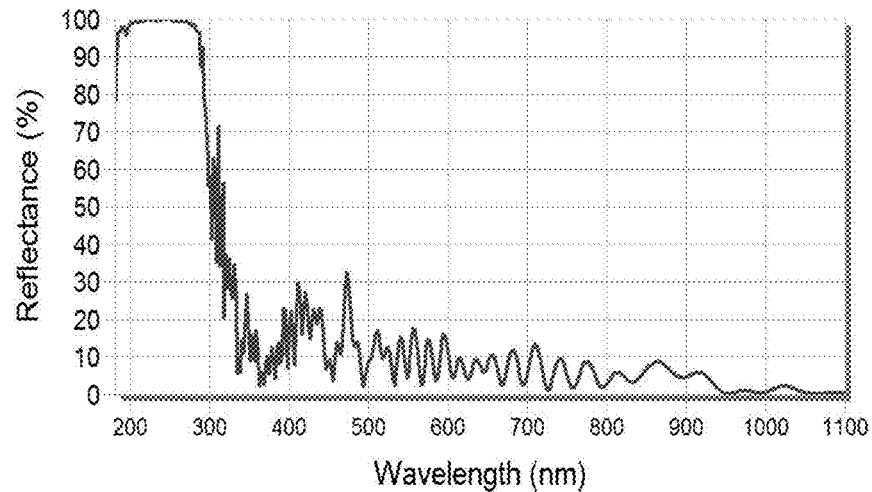
FIG. 7 is a graph of reflectance versus wavelength for a cold mirror in accordance with embodiments of the present disclosure.
Figure 8:
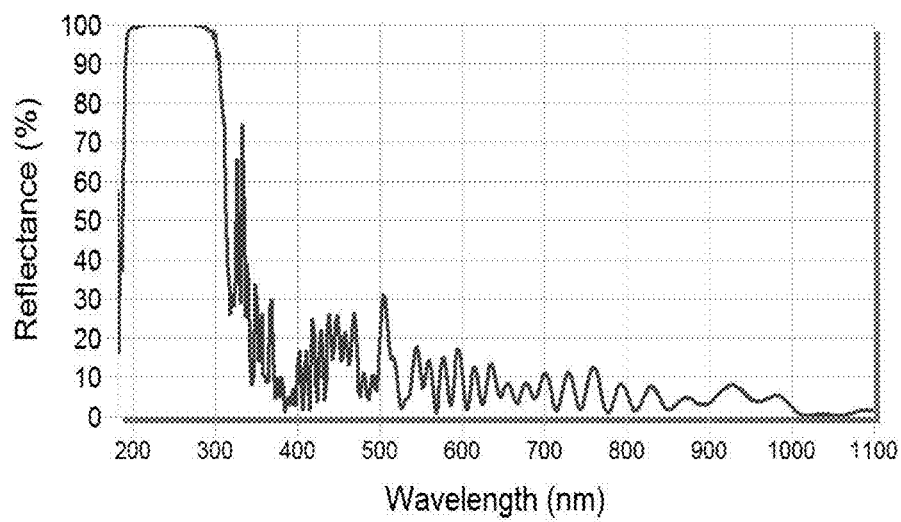
FIG. 8 is a graph of reflectance versus wavelength for a cold mirror in accordance with embodiments of the present disclosure.
Figure 9:
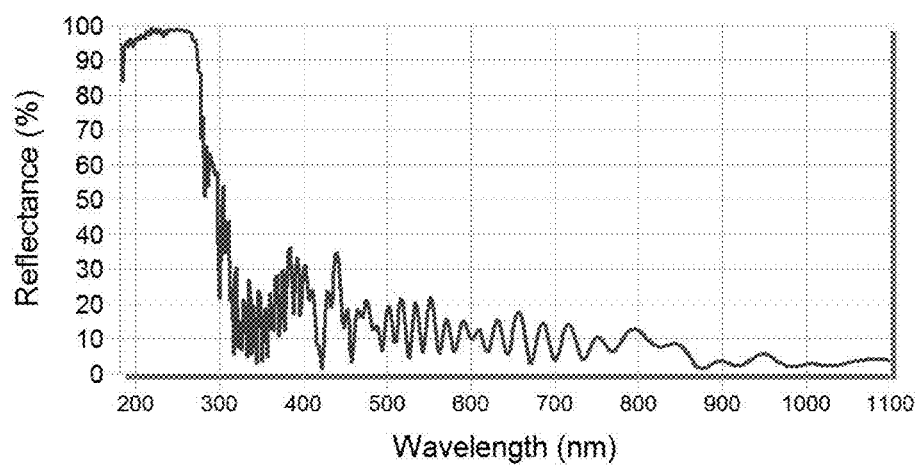
FIG. 9 is a graph of reflectance versus wavelength for a cold mirror in accordance with embodiments of the present disclosure.

According to embodiments of the present disclosure, the broadness of the high reflective band may be adjusted from the VIS-DUV region to the DUV region based on different intended applications. FIG. 7 is a graph of reflectance versus wavelength for a UV-DUV cold mirror having high reflectance between about 180 nm and about 290 nm at an angle of incidence of 45 degrees. FIG. 8 is a graph of reflectance versus wavelength for a UV-DUV cold mirror having high reflectance between about 190 nm and about 300 nm at an angle of incidence of 30 degrees. FIG. 9 is a graph of reflectance versus wavelength for a UV-DUV cold mirror having high reflectance between about 185 nm and about 270 nm at an angle of incidence of 60 degrees.

According to embodiments of the present disclosure, a method of forming the at least one coating 110 on a substrate 100 is provided. The method includes depositing the first coating stack 200 on the substrate 100. Depositing the first coating stack 200 on the substrate 100 includes depositing alternating period layers using an electron beam evaporation technique. Depositing the first coating stack 200 may further include using a modified, plasma-ion assisted, electron beam evaporation technique to form a first coating stack 200 that is dense and smooth. Depositing the first coating stack 200 on the substrate 100 may be completed at a temperature of between about 120° C. and about 150° C.

The method further includes depositing the second coating stack 300 on the first coating stack 200. Depositing the second coating stack 300 on the first coating stack 200 includes depositing alternating period layers using a thermal boat evaporation technique to deposit the fluoride layers and using an electron beam evaporation technique to deposit the oxide layers. Depositing the second coating stack 300 on the first coating stack 200 may be completed at a temperature sufficient to ensure densification of the second coating stack 300. The temperature may be between about 250° C. to about 400° C., or may be about 280° C. to about 320° C.

The method further includes depositing the third coating stack 400 on the second coating stack 300. Depositing the third coating stack 400 on the second coating stack 300 includes depositing alternating period layers using a thermal boat evaporation technique. For example, two thermal boats having a depth sufficient to restrict the angle of deposition may be used to deposit the alternating period layers. Depositing the third coating stack 400 on the second coating stack 300 may be completed at a temperature sufficient to ensure densification of the third coating stack 400. The temperature may be between about 250° C. to about 400° C., or may be about 280° C. to about 320° C.

Depositing the third coating stack 400 on the second coating stack 300 may further include depositing at least one intermediate layer 430 between periods of the alternating period layers, wherein the at least one intermediate layer 430 is a fluoride doped silica layer. In addition, depositing the third coating stack 400 on the second coating stack 300 may further include depositing a capping layer 440 over the outermost layer of the third coating stack 400, wherein the capping layer 440 is a fluoride doped silica layer. The at least one intermediate layer 430 and the capping layer 440 may be deposited using a modified, plasma ion assisted, electron beam evaporation technique to form a coating surface that is dense and smooth.

Depositing oxide layers using an electron beam evaporation technique may include placing an inversed mask above the oxide evaporation source to restrict the angle of deposition. The shape of the inversed masks may also be chosen to improve coating uniformity. Similarly, depositing fluoride layers using a thermal boat evaporation technique may include providing a thermal boat having a depth sufficient to restrict the angle of deposition.

Different deposition temperatures as discussed herein are selected to minimize interface stresses between the different coating stacks. Thus, a relatively low deposition temperature may be used when depositing the first coating stack 200, and a relatively high deposition temperature may be used when depositing the second coating stack 300 and the third coating stack 400.

The cold mirrors as described herein provide a laser damage resistant design, having low loss properties and that are environmentally stable in the UV-DUV range. The mirrors described herein may be used with broadband VIS-DUV laser-driven light sources and with broadband UV-DUV laser-driven light sources. The mirrors transmit IR driven laser radiation for plasma generation and collect corresponding VIS-DUV emission. Further, cold mirrors as described herein may reduce design complexity and increase lifetime of the laser-driven light sources when compared to conventional aluminum-based mirrors.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An expanded cold mirror, the mirror comprising:
   a substrate; and
   a coating deposited on the substrate, the coating comprising:
   a first coating stack comprising at least one period of a low refractive index metal oxide coating layer and a high refractive index metal oxide coating layer, the period including a layer pair of the low refractive index metal oxide coating layer and the high refractive index metal oxide coating layer and a repeat of the layer pair of the low refractive index metal oxide coating layer and the high refractive index metal oxide coating layer;
   a second coating stack comprising at least one period of a low refractive index metal fluoride coating layer and a high refractive index metal oxide coating layer, the period including a layer pair of the low refractive index metal fluoride coating layer and the high refractive index metal oxide coating layer and a repeat of the layer pair of the low refractive index metal fluoride coating layer and the high refractive index metal oxide coating layer; and
   a third coating stack comprising at least one period of a low refractive index metal fluoride coating layer and a high refractive index metal fluoride coating layer, the period including a layer pair of the low refractive index metal fluoride coating layer and the high refractive index metal fluoride coating layer and a repeat of the layer pair of the low refractive index metal fluoride coating layer and the high refractive index metal fluoride coating layer.

2. The expanded cold mirror of claim 1, wherein the first coating stack is deposited on the substrate, the second coating stack is deposited on the first coating stack, and the third coating stack is deposited on the second coating stack.

3. The expanded cold mirror of claim 1, wherein the substrate is selected from the group consisting of $CaF_2$, $SiO_2$, $F-SiO_2$, fused silica and quartz.

4. The expanded cold mirror of claim 1, wherein the low refractive index metal oxide coating layer is selected from the group consisting of $SiO_2$, $F-SiO_2$, N-doped $SiO_2$, and Al-doped $SiO_2$.

5. The expanded cold mirror of claim 1, wherein the high refractive index metal oxide coating layer is selected from the group consisting of $Al_2O_3$, $Ta_2O_5$, $Nb_2O_5$, $TiO_2$, $HfO_2$ and $Sc_2O_3$.

6. The expanded cold mirror of claim 1, wherein the low refractive index metal fluoride coating layer is selected from the group consisting of $AlF_3$, $MgF_2$, $CaF_2$, $BaF_2$, $SrF_2$ and $Na_3AlF_6$.

7. The expanded cold mirror of claim 1, wherein the high refractive index metal fluoride coating layer is a lanthanide metal fluoride selected from the group consisting of $LaF_3$, $GdF_3$, $PrF_3$, $NdF_3$, $PmF_3$, $SmF_3$, $EuF_3$, $DyF_3$ and $HoF_3$.

8. The expanded cold mirror of claim 7, wherein the high refractive index metal fluoride coating layer is one of $GdF_3$ and $LaF_3$.

9. The expanded cold mirror of claim 1, wherein the third coating stack further comprises at least one intermediate layer between two periods.

10. The expanded cold mirror of claim 9, wherein the at least one intermediate layer comprises $F-SiO_2$.

11. The expanded cold mirror of claim 1, wherein the third coating stack further comprises a capping layer.

12. The expanded cold mirror of claim 11, wherein the capping layer comprises $F-SiO_2$.

13. The expanded cold mirror of claim 1, wherein the low refractive index metal fluoride coating layer and the high refractive index metal fluoride coating layer comprise thermal boat evaporation deposited layers.

14. The expanded cold mirror of claim 1, wherein the low refractive index metal oxide coating layer and the high refractive index metal oxide coating layer comprise electron beam evaporation deposited layers.

15. The expanded cold mirror of claim 1, wherein the low refractive index metal oxide coating layer of the first coating stack comprises a $SiO_2$ layer, and the high refractive index metal oxide coating layer of the first coating stack comprises a $HfO_2$ layer;
   wherein the low refractive index metal fluoride coating layer of the second coating stack comprises an $AlF_3$ layer and the high refractive index metal oxide coating layer of the second coating stack comprises an $Al_2O_3$ layer; and
   wherein the low refractive index metal fluoride coating layer of the third coating stack comprises an $AlF_3$ layer, and the high refractive index metal fluoride coating layer of the third coating stack comprises a $GdF_3$ layer.

16. The expanded cold mirror of claim 1, wherein the mirror has a reflectance of greater than about 95% in the wavelength range of about 200 nm to about 760 nm at an angle of incidence of 45 degrees.

17. The expanded cold mirror of claim 1, wherein the mirror has a reflectance of greater than about 90% in the wavelength range of about 200 nm to about 760 nm, and reflectance of greater than about 95% in the wavelength range of about 250 nm to about 760 nm range at angles of incidence of 30 degrees, 40 degrees and 60 degrees.

18. The expanded cold mirror of claim 1, wherein the mirror has a reflectance of greater than about 95% in the wavelength range of about 180 nm to about 290 nm at an angle of incidence of 45 degrees.

19. The expanded cold mirror of claim 1, wherein the mirror has a reflectance of greater than about 95% in the wavelength range of about 190 nm to about 300 nm at an angle of incidence of 30 degrees.

20. The expanded cold mirror of claim 1, wherein the mirror has a reflectance of greater than about 95% in the wavelength range of about 185 nm to about 270 nm at an angle of incidence of 60 degrees.

* * * * *